Aug. 9, 1932.    C. H. SMITH    1,871,092
DEVICE FOR SECURING SLEEVES, COLLARS, OR THE LIKE ON CYLINDRICAL SHAFTS
Filed Feb. 27, 1930

INVENTOR
Charles Henry Smith
BY
C. P. Goepel
his ATTORNEY

Patented Aug. 9, 1932

1,871,092

UNITED STATES PATENT OFFICE

CHARLES HENRY SMITH, OF WILDCROFT, DANBURY, ENGLAND, ASSIGNOR TO NORMA-HOFFMANN BEARINGS CORPORATION, OF STAMFORD, CONNECTICUT, A CORPORATION OF NEW YORK

DEVICE FOR SECURING SLEEVES, COLLARS OR THE LIKE ON CYLINDRICAL SHAFTS

Application filed February 27, 1930, Serial No. 431,774, and in Great Britain April 22, 1929.

This invention relates to devices for securing sleeves, collars or the like on cylindrical shafts, and has for its general object and purpose to provide a simply constructed and easily operated device whereby the sleeve or collar may be quickly fixed in position with uniform security at all points about the periphery of the shaft.

It is a more particular object of the invention to provide a device of the above character primarily designed for the purpose of securing the inner race of a ball or roller bearing to a shaft and embodying a longitudinally shiftable sleeve arranged on the shaft having frictional wedging coaction with the inner face of the race ring, together with means for adjusting said sleeve.

It is also a further object of the invention to provide an improved means whereby the inner races of spaced ball or roller bearings may be simultaneously secured upon the shaft by the operation of a single manually adjustable part. Further, in one embodiment of the device, the said part is of such construction as to also effect the simultaneous release of the bearing races from connection with the shaft.

With the above and other objects in view, the invention consists in certain improvements in devices for securing sleeves, collars or the like to cylindrical shafts, as will be hereinafter more fully described, illustrated in the accompanying drawing, and subsequently incorporated in the subjoined claim.

In the drawing, wherein I have disclosed several simple and practical embodiments of the invention, and in which similar reference characters designate corresponding parts throughout the several views,—

Figure 1:
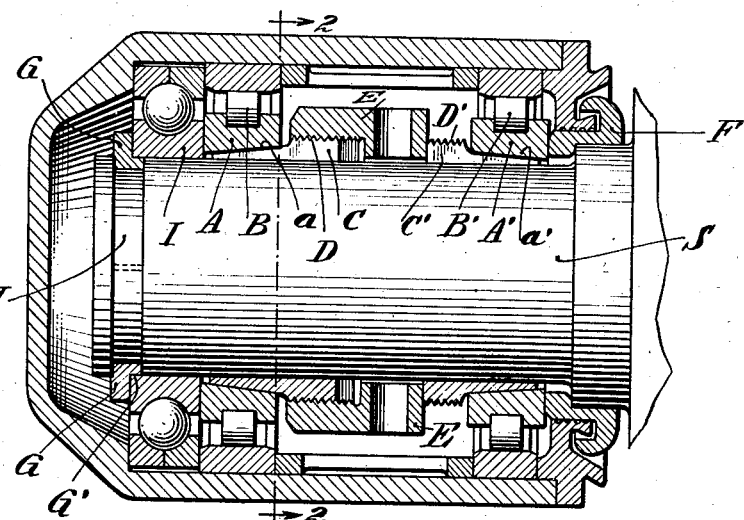
Figure 1 is a longitudinal section illustrating a practical embodiment of my invention as applied for the purpose of securing the inner races of spaced ball or roller bearings upon a shaft.
Figure 2:
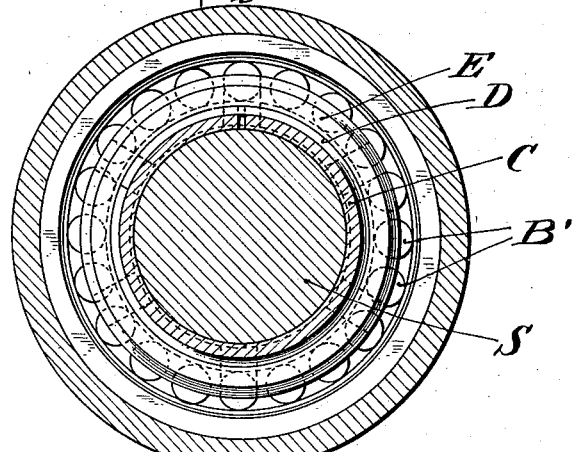
Fig. 2 is a sectional view taken on the line 2—2 of Fig. 1.

Referring in detail to the drawing, A, A' designate the two inner race rings of spaced bearings, and in the present instance, I have shown these race rings provided in their outer faces with suitably formed races for the reception of the rollers or other anti-friction bearing elements B, B'. The rings A, and A' have conical or tapered bores or inner faces as indicated at $a$, $a'$ which are of considerably greater diameter than the shaft S upon which they are to be secured.

With the race rings A, A' the longitudinally split sleeves C, C' respectively, are adapted to cooperate, said sleeves having conically formed outer surfaces for frictional wedging engagement with the inner faces or bores $a$, $a'$ of the respective race rings. Each of these sleeves has a relatively thick cylindrical end portion externally threaded as at D, D' respectively, for engagement by the internal thread on one end of a nut E. It will of course, be understood that this nut as well as the sleeves C, C' are normally loose upon the shaft S for free rotation relative thereto.

Assuming the several parts above referred to, to be in the relative positions shown in Fig. 1 of the drawing, it will be evident that if the nut E is rotated in a direction tending to unthread the same from the sleeve C, it will be forced against the end of the other conical sleeve C' so that the latter will be thrust along the shaft and into the bore of the race ring A'. Continued rotation of the nut in the same direction will then also force the conical sleeve C into the bore of the race ring A. Thus, there will be a simultaneous outward wedging action of the two conical sleeves against the race rings A and A', and owing to the fact that these sleeves are longitudinally split, the tapering portions thereof will thus be caused to tightly bind upon the periphery of the shaft S. In this manner, the two race rings are positively held or locked in position with uniform security around the periphery of the shaft.

Of course, it is necessary that an abutment means be provided at the outer ends of the race rings. In the present instance, I have shown an abutment means for the race ring A' in the form of a counterbored ring or annulus F which bears against the end face of the race ring and against a shoulder provided on the shaft S.

For the other race ring A, I have shown an abutment means embodying a divided collar G which may consist of two semi-circular sections fitting into a circumferential groove H in the periphery of the shaft S. The inner part of the collar is of reduced diameter as indicated at G' and extends within the outer end of the inner race ring I of a third bearing, said ring abutting against the outer end of the race ring A. Thus, when the several parts are assembled in the manner shown in the drawing, it will be apparent that they are fixedly held against relative movement providing the desired abutment means for the race ring A precluding any longitudinal shifting movement of said ring relative to the locking sleeve C. It will of course, be understood that if desired, in place of the two part ring G, I may use a single split ring adapted to be sprung into position within the circumferential groove H of the shaft S.

The split sleeve C' is preferably provided with the external threads D' so that the threaded nut E, after being operated to withdraw the sleeve C and release the race ring A, may be disconnected from said sleeve and reversed in position on the shaft S and engaged with the threads D' of the sleeve C'. By then screwing said nut upon the latter sleeve until the end of the nut abuts against the inner end of the race ring A', upon further rotation of the nut in the same direction, the conical sleeve C' will be withdrawn from the bore of the race ring A'.

Figure 3:
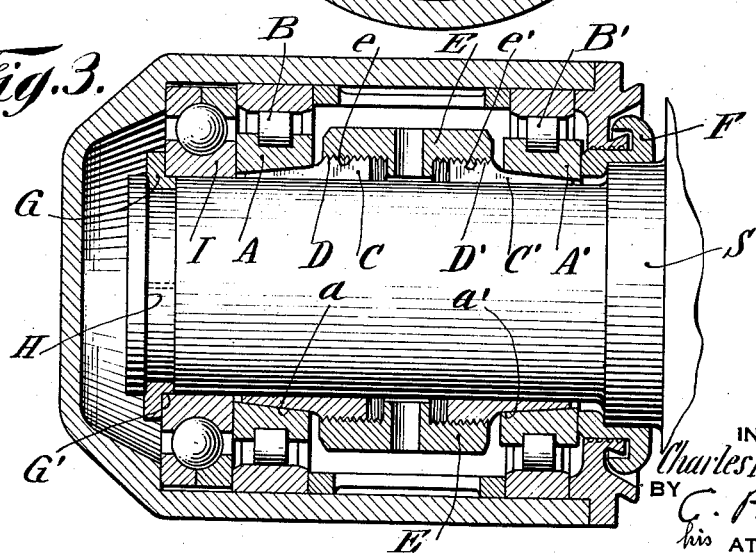
Fig. 3 is a view similar to Fig. 1 showing a modified embodiment of the device.

In Fig. 3 of the drawing, I have shown a slightly modified construction whereby the withdrawal of the two sleeves from locking position as well as their movement into locking engagement with the respective race rings, will take place simultaneously. For this purpose, I provide the nut E at opposite ends thereof with the internal threads e and e' respectively, for engagement with the threaded ends D, D' of the spaced sleeves C, C'. Of course, it will be understood that the threads in opposite ends of the nut and on the ends of the respective sleeves extend in relatively opposite directions, or to the right and left respectively, so that when the nut is turned in one direction, it will tend to draw the split sleeves inwardly towards each other, and when turned in the opposite direction, will force said sleeves apart and into engagement with the conical inner faces of the respective race rings A and A'.

From the foregoing description considered in connection with the accompanying drawing, the construction, manner of operation and several advantages of my invention will be clearly understood. It will of course, be evident that the accompanying illustrations simply disclose one adaptation of the essential features of the device, which is obviously capable of application to various other analogous uses. Therefore, it is to be understood that with respect to the abutment means which may be provided for the collars or inner race rings, as well as the other detail parts of the present disclosure, my invention is susceptible of embodiment in various other alternative mechanical structures, and therefore, the privilege is reserved of resorting to all such legitimate changes therein as may be fairly incorporated within the spirit and scope of the invention as claimed.

I claim:

In combination with a shaft and spaced bearings therefor each having an inner ring provided with an axially tapering inner face, spaced sleeves arranged on the shaft between said inner bearing rings, each of said sleeves being longitudinally split throughout its length and having opposed end portions externally threaded, the remaining portion of each sleeve having its outer surface longitudinally tapered for frictional contact with the tapered inner face of one of the bearing rings, and a nut surrounding said shaft and having an internally threaded end portion to receive the threaded end of one of the sleeves, the other end of said nut having abutting bearing contact against the opposed end face of the other sleeve whereby upon the rotation of said nut in one direction, the sleeves are forced into said bearing rings and contracted upon said shaft to lock the bearing rings solely by frictional radial pressure in fixed relation to the shaft, and said nut being adapted for interchangeable threaded engagement with the sleeves to withdraw the same from locked engagement with the bearing rings.

In testimony that I claim the foregoing as my invention, I have signed my name hereto.

CHARLES HENRY SMITH.